United States Patent
Su et al.

(10) Patent No.: US 7,763,184 B2
(45) Date of Patent: Jul. 27, 2010

(54) LIGHT STABILIZING LIQUID MATTER CONTAINING 2- (2-HYDROXY-3-α-CUMYL-5-TERT-OCTYLPHENYL) -2H-BENZOTRIAZOLE

(75) Inventors: Ching-Yie Su, Zhonghe (TW); Ming-Ho Chiu, Zhonghe (TW); Maw-Der Tsay, Zhonghe (TW)

(73) Assignee: Double Bond Chem. Ind. Co., Ltd., Taipei (TW)

( * ) Notice: Subject to any disclaimer, the term of this patent is extended or adjusted under 35 U.S.C. 154(b) by 557 days.

(21) Appl. No.: 11/826,860

(22) Filed: Jul. 19, 2007

(65) Prior Publication Data

US 2008/0156227 A1 Jul. 3, 2008

(30) Foreign Application Priority Data

Jan. 3, 2007 (TW) .............................. 96100161 A

(51) Int. Cl.
*C09K 12/20* (2006.01)
*C09K 15/16* (2006.01)
*C09K 9/00* (2006.01)
*C09K 3/00* (2006.01)
*C07D 249/18* (2006.01)
*C07D 249/20* (2006.01)
*C07D 403/00* (2006.01)

(52) U.S. Cl. .................. 252/401; 252/390; 252/182.29; 252/582; 252/588; 252/589; 548/260; 548/261; 548/257; 106/287.21

(58) Field of Classification Search ................. 252/390, 252/401, 182.29, 582, 588, 589; 548/260, 548/261, 257
See application file for complete search history.

(56) References Cited

U.S. PATENT DOCUMENTS

| | | | |
|---|---|---|---|
| 4,278,589 A | 7/1981 | Dexter et al. | |
| 4,727,158 A | 2/1988 | Seltzer et al. | |
| 5,563,242 A * | 10/1996 | Winter et al. | 524/91 |
| 5,574,166 A | 11/1996 | Winter et al. | |
| 5,879,438 A * | 3/1999 | Fujita et al. | 106/31.18 |
| 6,166,218 A * | 12/2000 | Ravichandran et al. | 548/257 |
| 7,173,128 B2 * | 2/2007 | Ravichandran et al. | 544/92 |
| 7,291,662 B2 * | 11/2007 | King et al. | 524/128 |
| 2001/0007886 A1 * | 7/2001 | Ravichandran et al. | 524/91 |
| 2001/0034449 A1 * | 10/2001 | Galbo et al. | 546/186 |
| 2003/0074833 A1 * | 4/2003 | Wood et al. | 44/275 |
| 2004/0167255 A1 * | 8/2004 | Lee et al. | 524/100 |
| 2005/0159514 A1 * | 7/2005 | McMan et al. | 524/86 |
| 2006/0068122 A1 | 3/2006 | Kanouni et al. | |
| 2008/0027182 A1 * | 1/2008 | McNamara et al. | 525/386 |
| 2008/0105856 A1 * | 5/2008 | DebRoy et al. | 252/589 |

FOREIGN PATENT DOCUMENTS

WO  WO 2005/047384 A1  5/2005

* cited by examiner

*Primary Examiner*—Joseph D Anthony
(74) *Attorney, Agent, or Firm*—Finnegan, Henderson, Farabow, Garrett & Dunner, L.L.P.

(57) ABSTRACT

A light stabilizing liquid matter, that can be added to a composition to be stabilized and that has a storage stability high enough for storage before being added to the composition, includes a product formed by mixing:

(A)  2-(2-hydroxy-3-α-cumyl-5-tert-octylphenyl)-2H-benzotriazole with (B) at least one benzotriazole compound other than 2-(2-hydroxy-3-α-cumyl-5-tert-octylphenyl)-2H-benzotriazole plus a hindered amine compound, or with (B') at least one compound selected from the group consisting of a benzotriazole compound other than 2-(2-hydroxy-3-α-cumyl-5-tert-octylphenyl)-2H-benzotriazole, and a hindered amine compound, and (C) an anti-oxidant including at least one compound selected from the group consisting of a phosphite compound and a phenolic compound.

14 Claims, No Drawings

LIGHT STABILIZING LIQUID MATTER CONTAINING 2-(2-HYDROXY-3-α-CUMYL-5-TERT-OCTYLPHENYL)-2H-BENZOTRIAZOLE

CROSS-REFERENCE TO RELATED APPLICATION

This application claims priority of Taiwanese Application No. 096100161, filed on Jan. 3, 2007.

BACKGROUND OF THE INVENTION

1. Field of the Invention

The invention relates to a light stabilizing liquid matter, more particularly to a light stabilizing liquid matter containing a relatively high concentration of 2-(2-hydroxy-3-α-cumyl-5-tert-octylphenyl)-2H-benzotriazole.

2. Description of the Related Art

Generally, it is preferable to have a coating which can provide long-time protection for a substrate on which the coating is applied so as to prevent the substrate from aging due to long-time exposure under an ultraviolet light, especially at a temperature-elevating environment. Therefore, there is an ongoing need in the art to find a solution to the problem of loss of an ultraviolet absorber (hereinafter referred to as an UV absorber) due to sublimation, evaporation, or leakage out of the coating.

When a benzotriazole compound is used as an UV absorber, in order to provide a coating composition with superior weather resistance, the solubility and compatibility of the benzotriazole compound in the coating composition is modified by changing the chemical structure of the benzotriazole compound. For example, 2-(2-hydroxy-3-α-cumyl-5-tert-octylphenyl)-2H-benzotriazole was developed according to this concept, and can be prepared according to the manner described in Example 18 of U.S. Pat. No. 4,278,589. Similarly, U.S. Pat. No. 4,727,158 discloses benzotriazole compounds having specifical chemical structures. Furthermore, U.S. Pat. No. 5,574,166 discloses that 2-(2-hydroxy-3-α-cumyl-5-tert-octylphenyl)-2H-benzotriazole having a specific soluble crystalline form can exhibit acceptable properties in respect to handling, apparent density, flowability, meterability and storage stability.

The benzotriazole UV absorber is usually blended with other UV absorbers, anti-oxidants, colorants, dyes, emulsifiers, plasticizers, lubricants, anti-static agents, optical brighteners, flame-proofing agents, blowing agents and the like to form a composition. If the composition is powder, the powder is usually added directly to a substrate material to be stabilized for blending and for subsequent molding. If the composition is liquid, it is usually applied on a substrate to be stabilized by coating or by spraying.

2-(2-hydroxy-3-α-cumyl-5-tert-octylphenyl)-2H-benzotriazole is an ivory white fine crystalline powder, and has a good effect of inhibiting aging of an organic substrate due to irradiation of light. As compared to a tris-aryl-s-triazine compound, which is another type of the UV absorber used in the art for a coating composition, 2-(2-hydroxy-3-α-cumyl-5-tert-octylphenyl)-2H-benzotriazole has better solubility in a solvent, such as xylene, methyl amyl ketone, butylcellosolve, butylcarbitol, or methyl isobutyl ketone, commonly used in the coating composition. Therefore, 2-(2-hydroxy-3-α-cumyl-5-tert-octylphenyl)-2H-benzotriazole is commonly used as the UV absorber in the coating composition.

However, according to the description of product manuals of Ciba Specialty Chemicals, the solubility of 2-(2-hydroxy-3-α-cumyl-5-tert-octylphenyl)-2H-benzotriazole in 100 g of butanol, 1-methoxy-2-propanol acetate, butylglycol acetate, ethylglycol acetate, and methoxypropanol at 20° C. are 17 g, 9.4 g, 9.5 g, and 2.9 g, respectively, which are not satisfactory in the art.

Additionally, since 2-(2-hydroxy-3-α-cumyl-5-tert-octylphenyl)-2H-benzotriazole is packed in a powder form, it should be taken out of a package carefully. Otherwise, it may be the cause of an environmental problem and may be detrimental to the skin and the respiratory tract of a user.

Conventionally, in preparing a coating composition, the powdery 2-(2-hydroxy-3-α-cumyl-5-tert-octylphenyl)-2H-benzotriazole is blended with the other components, such as other UV absorbers, light stabilizers, anti-oxidants, colorants, resins and solvents, by stirring the components at an elevated temperature. A disadvantage of the aforesaid powdery benzotriazole is that a long period of stirring is needed in order to prevent incomplete dissolution of the powdery benzotriazole, which may cause inferior performance of the coating composition. Therefore, the cost for producing the coating composition from 2-(2-hydroxy-3-α-cumyl-5-tert-octylphenyl)-2H-benzotriazole in a powdery form is relatively high. Furthermore, the 2-(2-hydroxy-3-α-cumyl-5-tert-octylphenyl)-2H-benzotriazole powder, upon storage, is liable to become clumpy due to the weight and pressure induced in storing the packages of the powder. As the clumps are less soluble and less dispersable, much more inconveniences can be encountered in handling the clumps than the powder. On the other hand, if the powdery 2-(2-hydroxy-3-α-cumyl-5-tert-octylphenyl)-2H-benzotriazole is to be stored by dissolving the same in a solvent, there are risks of explosion and combustion.

WO 2005/047384 discloses two types of UV stabilizing compositions, one of which includes an ortho-hydroxy tri-aryl-s-triazine compound, a hindered amine compound, and a hydroxybenzophenone compound, and the other of which includes an ortho-hydroxy tri-aryl-s-triazine compound, a hindered amine compound, and a benzotriazole compound. The Examples in the WO publication disclose that the components of the UV stabilizing composition are mixed together by a dry blending technique, and the resulting mixture is subsequently compounded with a resin such as polyethylene. No solvent is used to dissolve the components of the UV stabilizing composition before compounding with the resin. However, as the UV stabilizing composition is compounded with the resin subsequent to dry blending, the blend of the components of the UV stabilizing composition used therein might not be suitable for storage.

US 2006/0068122 A1 discloses a method for incorporating a light stabilizer into a polymeric substrate such as coatings, paints and plastics. The light stabilizer includes ultraviolet absorbers and hindered amine light stabilizers. It is disclosed in this publication that 2-(2-hydroxy-3-α-cumyl-5-tert-octylphenyl)-2H-benzotriazole can be used as the UV absorber, that the light stabilizers are mixed with a non-reactive carrier and any other ancillary materials of a coating composition, and that the carrier is selected from the group consisting of solvents, organic oligomers and polymers, rheology modifiers including thickeners, surfactants, soaps including soaps based on salts of fatty acids for example sodium lauryl sulfate, silicones and emulsifiers. It is disclosed on Paragraph 0128 that for the liquid formulations of the coating compositions, the amount of the light stabilizer in the coating composition upon application is between about 0.1% and about 10% by weight. The publication further describes that the stabilizers must form a solution, suspension or emulsion stable enough to allow for an even and efficient application to a polymeric substrate. However, the publication does not suggest any UV stabilizing liquid that is stable enough for storage.

SUMMARY OF THE INVENTION

An object of the present invention is to provide a light stabilizing liquid matter that contains a relatively high concentration of 2-(2-hydroxy-3-α-cumyl-5-tert-octylphenyl)-2H-benzotriazole dissolved therein and that has a storage stability high enough for storage so that the light stabilizing liquid matter can be stored before being compounded with a coating composition.

Another object of the present invention is to provide a light stabilizing liquid matter of high storage stability, in which 2-(2-hydroxy-3-α-cumyl-5-tert-octylphenyl)-2H-benzotriazole can be stored in a liquid state without using any volatile solvent so as to avoid the risk of explosion or combustion.

Still another object of the present invention is to provide a light stabilizing liquid matter which contains a relatively high concentration of 2-(2-hydroxy-3-α-cumyl-5-tert-octylphenyl)-2H-benzotriazole in admixture with other additives of a coating composition and which forms a premix for a coating composition, the premix having a storage stability high enough for storage before being compounded with the coating composition. With the premix provided by the present invention, downstream manufacturers may readily obtain 2-(2-hydroxy-3-α-cumyl-5-tert-octylphenyl)-2H-benzotriazole as a liquid in admixture with other additives for manufacturing conveniently the products to be stabilized such as coatings, paints, plastics, etc.

Accordingly, the present invention provides a light stabilizing liquid matter that can be added to a composition to be stabilized and that has a storage stability high enough for storage before being added to the composition. The light stabilizing liquid matter comprises:

a product formed by mixing (A) 2-(2-hydroxy-3-α-cumyl-5-tert-octylphenyl)-2H-benzotriazole with (B) at least one benzotriazole compound other than 2-(2-hydroxy-3-α-cumyl-5-tert-octylphenyl)-2H-benzotriazole plus a hindered amine compound, or with (B') at least one compound selected from the group consisting of a benzotriazole compound other than 2-(2-hydroxy-3-α-cumyl-5-tert-octylphenyl)-2H-benzotriazole, and a hindered amine compound, and (C) an anti-oxidant including at least one compound selected from the group consisting of a phosphite compound and a phenolic compound.

While the light stabilizing liquid matter may additionally include other compounds or additives which will be described hereinafter, the components A, and B, or B' and C are major components in the liquid matter. The sum of the components A and B, or the sum of the components A, B' and C should be in an amount more than 90 wt % and even more than 99% based on a total weight of the light stabilizing liquid matter.

DETAILED DESCRIPTION OF THE PREFERRED EMBODIMENTS

In the present invention, 2-(2-hydroxy-3-α-cumyl-5-tert-octylphenyl)-2H-benzotriazole is mixed with the component B or the component B' plus the component C. Although the compounds used in the components B and C of the light stabilizing liquid matter of the present invention are commonly used as light stabilizers or anti-oxidants in the art, the light stabilizing liquid matter that contains a relatively high concentration of 2-(2-hydroxy-3-α-cumyl-5-tert-octylphenyl)-2H-benzotriazole in admixture with other compounds or additives, and that forms a premix having a storage stability high enough for storage before being compounded with a coating composition is not suggested in the art.

The term "storage stability" as used herein is intended to mean that when the light stabilizing liquid matter containing 2-(2-hydroxy-3-α-cumyl-5-tert-octylphenyl)-2H-benzotriazole is stored, 2-(2-hydroxy-3-α-cumyl-5-tert-octylphenyl)-2H-benzotriazole is maintained in a non-precipitated state. That is to say, 2-(2-hydroxy-3-α-cumyl-5-tert-octylphenyl)-2H-benzotriazole is not precipitated out of the light stabilizing liquid matter. The longer the duration of the non-precipitated state, the better the storage stability will be.

Generally, when the compounds used in the components B, B' and C of the present invention are liquids at normal temperature and pressure, the powdery 2-(2-hydroxy-3-α-cumyl-5-tert-octylphenyl)-2H-benzotriazole can be liquefied by dissolving in the liquid compounds of the components B, B' and/or C. However, from the experiments, the inventors found that, when the benzotriazole compounds of the component B or B' are solids at normal temperature and pressure, the powdery 2-(2-hydroxy-3-α-cumyl-5-tert-octylphenyl)-2H-benzotriazole can also be liquefied or melted by mixing it with the aforesaid solid compounds of the component B or B' and by heating the mixture to an elevated temperature, and that the melted or liquefied 2-(2-hydroxy-3-α-cumyl-5-tert-octylphenyl)-2H-benzotriazole is stable at normal temperature and pressure. Specifically, the inventors found that when some of the compounds of the component B (for example, 2-(2H-benzotriazol-2-yl)-4-(tert-butyl)-6-(sec-butyl)phenol and 2-(3',5'-di-t-amyl-2'-hydroxyphenyl)benzotriazole), which are solids at normal temperature and pressure, are used as the component B, the liquid matter formed thereby can have good storage stability at normal temperature and pressure. The inventors believe that, in order to achieve good storage stability, the light stabilizing liquid matter does not necessarily require a high amount of the liquid compounds of the component B, B' and/or C and that whether or not 2-(2-hydroxy-3-α-cumyl-5-tert-octylphenyl)-2H-benzotriazole is stably present in the light stabilizing liquid matter without precipitation is not determined merely by its solubility.

The inventors also found that the storage stability of the liquid matter of the present invention can be further improved by incorporating the phosphite compound and/or the phenolic compound used in the component C in the liquid matter.

Since 2-(2-hydroxy-3-α-cumyl-5-tert-octylphenyl)-2H-benzotriazole is dissolved in the liquid matter, there is no lower limit for the amount of the component A (i.e., 2-(2-hydroxy-3-α-cumyl-5-tert-octylphenyl)-2H-benzotriazole) in the liquid matter of the present invention. The component A is in an amount preferably less than 75 wt %, more preferably from 25 wt % to 60 wt %, based on the total weight of the liquid matter.

As described above, the component B of the liquid matter of the present invention includes at least one benzotriazole compound other than 2-(2-hydroxy-3-α-cumyl-5-tert-octylphenyl)-2H-benzotriazole plus a hindered amine compound. Preferably, the component B further includes a triazine compound.

Preferably, examples of the benzotriazole compound other than 2-(2-hydroxy-3-α-cumyl-5-tert-octylphenyl)-2H-benzotriazole includes:

2-(2-hydroxy-3,5-di-tert-butylphenyl)benzotriazole; 2-[2-hydroxy-3,5-di(α,α-dimethylbenzyl)phenyl]benzotriazole;

2-(2-hydroxy-5-methylphenyl)-benzotriazole;

2-(2-hydroxy-5-tert-butylphenyl)-benzotriazole;

5-chloro-2-(2-hydroxy-3-tert-butyl-5-methylphenyl)-benzotriazole;

5-chloro-2-(2-hydroxy-3,5-di-tert-butyl-5-methylphenyl)-benzotriazole;

2-(2-hydroxy-3-tert-phenyl-5-methyl)-benzotriazole;

2-(2-hydroxy-3,5-di-tert-amyl)-benzotriazole;

2-(2-hydroxy-3-sec-butyl{-5-tert-butyl}-benzotriazole;

2-(2-hydroxy-4-octyloxy)-benzotriazole;

2-(2-hydroxy-5-tert-octyl)-benzotriazole;

2-(2-hydroxy-5-dodecyl)-benzotriazole;

2-(2-hydroxy-3-dodecyl-5-methylphenyl)benzotriazole;

2-[2-hydroxy-3-(α,α'-dimethylbenzyl)-5-(1,1,3,3-tetramethylbutyl)phenyl]benzotriazole;

2,2'-methylenebis[4-(1,1,3,3-tetramethylbutyl)-6-benzotriazol-2-ylphenol];

2,[2-hydroxy-3-(3,4,5,6-tetrahydrophthalimidomethyl)-5-methylphenyl]benzotriazole;

2-[3-tert-butyl-5-(2-(2-ethylhexyloxycarbonylethyl))-2-hydroxyphenyl]benzotriazole;

a mixture of transesterification products of 2-[(3-tert-butyl-5-(2-methoxycarbonylethyl)-2-hydroxyphenyl)benzotriazole]and polyethylene glycol 300;

5-chloro-2-[2-hydroxy-3-tert-butyl-5-(2-octyloxycarbonyl) ethylphenyl]benzotriazole;

3-(2H-benzotriazol-2-yl)-5-(1,1-dimethylethyl)-4-hydroxy-$C_{7-9}$-branched and linear alkyl esters of benzenepropanoic acid;

2-(2H-benzotriazol-2-yl)-4-(tert-butyl)-6-(sec-butyl)phenol;

2-(3',5'-di-tert-amyl-2'-hydroxyphenyl)benzotriazole;

α-[3-[3-(2H-benzotriazol-2-yl)-5-(1,1-dimethylethyl)-4-hydroxyphenyl]-1-oxopropyl]-ω-hydroxypoly(oxo-1,2-ethane-diyl);

a mixture of α-[3-[3-(2H-benzotriazol-2-yl)-5-(1,1-dimethyl-ethyl)-4-hydroxyphenyl]-1-oxopropyl]-ω-[3-[3-(2H-benzotriazol-2-yl)-5-(1,1-dimethyl-ethyl)-4-hydroxyphenyl]-1-oxopropoxy]poly(oxy-1,2-ethane-diyl) and polyethylene glycol 300;

a branched and linear 2-(2H-benzotriazol-2-yl)-6-dodecyl-4-methyl-phenol; and combinations thereof.

More preferably, examples of the benzotriazole compound other than 2-(2-hydroxy-3-α-cumyl-5-tert-octylphenyl)-2H-benzotriazole includes 2-(2-hydroxy-3,5-di-tert-butylphenyl)benzotriazole (for example, Chisorb-320, a light absorber manufactured by Double Bond Chemical, Taiwan);

2-[2-hydroxy-3,5-di(α,α-dimethylbenzyl)phenyl]benzotriazole (for example, Chisorb-234, a light absorber manufactured by Double Bond Chemical, Taiwan);

3-(2H-benzotriazol-2-yl)-5-(1,1-dimethylethyl)-4-hydroxy-$C_{7-9}$-branched and linear alkyl esters of benzenepropanoic acid (for example, Chisorb-5584, a light absorber manufactured by Double Bond Chemical, Taiwan);

2-(2H-benzotriazol-2-yl)-4-(tert-butyl)-6-(sec-butyl)phenol (for example, Chisorb-350, a light absorber manufactured by Double Bond Chemical, Taiwan);

2-(3',5'-di-tert-amyl-2'-hydroxyphenyl)benzotriazole (for example, Chisorb-328, a light absorber manufactured by Double Bond Chemical, Taiwan);

a mixture of α-[3-[3-(2H-benzotriazol-2-yl)-5-(1,1-dimethyl-ethyl)-4-hydroxyphenyl]-1-oxopropyl]-ω-[3-[3-(2H-benzotriazol-2-yl)-5-(1,1-dimethyl-ethyl)-4-hydroxyphenyl]-1-oxopropoxy]poly(oxy-1,2-ethane-diyl) and polyethylene glycol 300 (for example, Chisorb-5530, a light absorber manufactured by Double Bond Chemical, Taiwan);

branched and linear 2-(2H-benzotriazol-2-yl)-6-dodecyl-4-methyl-phenol (for example, Chisorb-5571, a light absorber manufactured by Double Bond Chemical, Taiwan);

2-(2-hydroxy-5-tert-octyl)benzotriazole (for example, Chisorb-5411, a light absorber manufactured by Double Bond Chemical, Taiwan);

2-(2-hydroxy-5-dodecyl)benzotriazole (for example, Chisorb-800, a light absorber manufactured by Double Bond Chemical, Taiwan);

and combinations thereof.

Most preferably, examples of the benzotriazole compound other than 2-(2-hydroxy-3-α-cumyl-5-tert-octylphenyl)-2H-benzotriazole include a mixture of 2-(2H-benzotriazol-2-yl)-4-(tert-butyl)-6-(sec-butyl)phenol and 2-(3',5'-di-tert-amyl-2'-hydroxyphenyl)benzotriazole;

a mixture of 3-(2H-benzotriazol-2-yl)-5-(1,1-dimethyl-ethyl)-4-hydroxy-$C_{7-9}$-branched and linear alkyl esters of benzenepropanoic acid, 2-(2H-benzotriazol-2-yl)-4-(tert-butyl)-6-(sec-butyl)phenol, and 2-(3',5'-di-tert-amyl-2'-hydroxyphenyl)benzotriazole;

a mixture of 3-(2H-benzotriazol-2-yl)-5-(1,1-dimethyl-ethyl)-4-hydroxy-$C_{7-9}$-branched and linear alkyl esters of benzenepropanoic acid, 2-(2H-benzotriazol-2-yl)-4-(tert-butyl)-6-(sec-butyl)phenol, 2-(3',5'-di-tert-amyl-2'-hydroxyphenyl)benzotriazole, and 2-(2-hydroxy-5-tert-octyl)-benzotriazole;

a mixture of 2-(2H-benzotriazol-2-yl)-4-(tert-butyl)-6-(sec-butyl)phenol, 2-(3',5'-di-tert-amyl-2'-hydroxyphenyl)benzotriazole, and 2-(2-hydroxy-5-dodecyl)-benzotriazole; and a mixture of α-[3-[3-(2H-benzotriazol-2-yl)-5-(1,1-dimethyl-ethyl)-4-hydroxyphenyl]-1-oxopropyl]-ω-[3-[3-(2H-benzotriazol-2-yl)-5-(1,1-dimethyl-ethyl)-4-hydroxyphenyl]-1-oxopropoxy]poly(oxy-1,2-ethane-diyl) and polyethylene glycol 300.

Preferably, examples of the hindered amine compound include:

1H-pyrrole-2,5-dione, 1-octadecyl-, polymer with (1-methylethenyl)benzene and 1-(2,2,6,6-tetramethyl-4-piperidinyl)-1H-pyrrole-2,5-dione;

1,1',1''-[1,3,5-triazine-2,4,6-triyltris[(cyclohexylimino)-2,1-ethanediyl]]tris[3,3,5,5-tetramethyl-]piperazinone;

1,1',1''-[1,3,5-triazine-2,4,6-triyltris[(cyclohexylimino)-2,1-ethanediyl]]tris[3,3,4,5,5-pentamethyl-]piperazinone;

the reaction product of 7,7,9,9-tetramethyl-2-cycloundecyl-1-oxa-3,8-diaza-4-oxospiro[4,5]decane and epichlorohydrin;

the condensate of N,N'-bis(2,2,6,6-tetramethylpiperidin-4-yl)hexamethylenediamine and 4-cyclohexylamino-2,6-dichloro-1,3,5-triazine;

the condensate of 1,2-bis(3-aminopropylamino)ethane;

2,4,6-trichloro-1,3,5-triazine and 4-butylamino-2,2,6,6-tetramethylpiperidine;

the condensate of N,N'-bis(2,2,6,6-tetramethylpiperidin-4-yl)hexamethylenediamine and 4-morpholino-2,6-dichloro-1,3,5-triazine;

the condensate of 2-chloro-4,6-bis(4-n-butylamino-2,2,6,6-tetramethyl piperidyl)-1,3,5-triazine and 1,2-bis(3-aminopropylamino)ethane;

the condensate of 2-chloro-4,6-bis(4-n-butylamino-1,2,2,6,6-pentamethylpiperidyl)-1,3,5-triazine and 1,2-bis(3-aminopropylamino)ethane;

2-[(2-hydroxyethyl)amino]-4,6-bis[N-(1-cyclohexyloxy-2,2,6,6-tetramethylpiperidin-4-yl)butylamino-1,3,5-triazine];

[(4-methoxyphenyl)-methylene]-bis-(1,2,2,6,6-pentamethyl-4-piperidinyl)propanedioate;
tetrakis(2,2,6,6-tetramethylpiperidin-4-yl)-1,2,3,4-butanetetracarboxylate;
3,5-bis(1,1-dimethylethyl)-4-hydroxy-,
1-[2-[3-[3,5-bis(1,1-dimethylethyl)-4-hydroxyphenyl]-1-oxopropoxy]ethyl]-2,2,6,6-tetramethyl-4-piperidinyl benzenepropanoate;
N-(1-octyloxy-2,2,6,6-tetramethylpiperidin-4-yl)-N'-dodecyloxalamide;
tris(2,2,6,6-tetramethylpiperidin-4-yl)nitrilotriacetate;
1,5-dioxaspiro{5,5}undecane-3,3-dicarboxylic acid, bis(1,2,2,6,6-pentamethyl-4-piperidinyl);
1,5-dioxaspiro{5,5}undecane-3,3-dicarboxylic acid, bis(2,2,6,6-tetramethyl-4-piperidinyl);
the condensate of 1-(2-hydroxyethyl)-2,2,6,6-tetramethyl-4-hydroxypiperidine and succinic acid;
the condensate of N,N'-bis(2,2,6,6-tetramethylpiperidin-4-yl)hexamethylenediamine and 4-tert-octylamino-2,6-dichloro-1,3,5-triazine;
1,2,2,6,6-pentamethyl-4-piperidinyl tridecyl 1,2,3,4-butanetetracarboxylate;
tetrakis(2,2,6,6-tetramethylpiperidin-4-yl)-1,2,3,4-butanetetracarboxylate;
2,2,6,6-tetramethyl-4-piperidinyl tridecyl 1,2,3,4-butanetetracarboxylate;
tetrakis(1,2,2,6,6-pentamethylpiperidin-4-yl)-1,2,3,4-butanetetracarboxylate;
mixture of 2,2,4,4-tetramethyl-21-oxo-7-oxa-3.20-diazaspiro(5.1.11.2)-heneicosane-20-propanoic acid-dodecylester;
2,2,4,4tetramethyl-21-oxo-7-oxa-3.20-diazaspiro(5.1.11.2)-heneicosane-20-propanoic acid-tetradecylester;
hexahydro-2,6-bis(2,2,6,6-tetramethyl-4-piperidinyl)-1H,4H,5H,8H-2,3a,4a,6,7a,8a-hexaazacyclopenta[def]fluorene-4,8-dione;
poly-methyl[propyl-3-oxy(2',2',6',6'-tetramethyl-4,4'-piperidinyl)]siloxane;
poly-methyl[propyl-3-oxy(1',2',2',6',6'-pentamethyl-4,4'-piperidinyl)]siloxane;
copolymer of methylmethacrylate with ethyl acrylate and 2,2,6,6-tetramethylpiperidin-4-yl acrylate; copolymer of mixed $C_{20}$ to $C_{24}$ alpha-olefins and (2,2,6,6-tetramethylpiperidin-4-yl)succinimide;
1,2,3,4-butanetetracarboxylic acid, polymer with β,β,β',β'-tetramethyl-2,4,8,10-tetraoxaspiro[5,5]undecane-3,9-diethanol, 1,2,2,6,6-pentamethyl-4-piperidinyl ester;
1,2,3,4-butanetetracarboxylic acid, polymer with β,β,β',β'-tetramethyl-2,4,8,10-tetraoxaspiro[5,5]undecane-3,9-diethanol, 2,2,6,6-tetramethyl-4-piperidinyl ester copolymer;
N,N'-bis(2,2,6,6-tetramethyl-4-piperidinyl)1,3-benzenedicarboxamide;
1,1'-(1,10-dioxo-1,10-decanediyl)-bis(hexahydro-2,2,4,4,6-pentamethylpyrimidine);
N-(1-acetyl-2,2,6,6-tetramethylpiperidinyl)-N'-dodecyl ethane diamide;
N,N'-1,6-hexanediylbis[N-(2,2,6,6-tetramethyl-4-piperidinyl)formamide];
1,3:2,4-bis-O-(2,2,6,6tetramethyl-4-piperidinylidene)-D-glucitol;
2,2,4,4-tetramethyl-7-oxa-3,20-diaza-21-oxo-dispiro[5.1.11.2]heneicosane;
2-methyl-N-(2,2,6,6-tetramethyl-4-piperidinyl)-2-[(2,2,6,6-tetramethyl-4-piperidinyl)amino]-propanamide;
7-oxa-3,20-diazadispiro[5.1.11.2]heneicosane-20-propanoic acid, 2,2,4,4-tetramethyl-21-oxo-, dodecyl-ester;
N-(2,2,6,6-tetramethylpiperidin-4-yl)-β-aminopropionic acid dodecyl ester;
N-(2,2,6,6-tetramethylpiperidin-4-yl)-N'-aminooxalamide;
N-(2,2,6,6-tetramethyl-4-piperinyl)-3-[(2,2,6,6-tetramethyl-4-piperidinyl)amino]-propanamide;
mixture of 4-hexadecyloxy- and 4-stearyloxy-2,2,6,6-tetramethyl]peridine;
3-dodecyl-1-(1,2,2,6,6-pentamethylpiperidin-4-yl)pyrrolidine-2,5-dione;
3-dodecyl-1-(1-ethanoyl-2,2,6,6-pentamethylpiperidin-4-yl) pyrrolidine-2,5-dione;
bis(2,2,6,6-tetramethylpiperidin-4-yl)succinate;
bis(1,2,2,6,6-pentamethylpiperidin-4-yl)n-butyl 3,5-di-tert-butyl-4-hydroxybenzylmalonate;
tris(2,2,6,6-tetramethylpiperidin-4-yl)nitrilotriacetate;
1,1'-(1,2-ethanediyl)bis(3,3,5,5-tetramethylpiperazinone);
4-benzoyl-2,2,6,6-tetramethylpiperidine;
4-stearyloxy-2,2,6,6-tetramethylpiperidine;
bis(1,2,2,6,6-pentamethylpiperidyl)-2-n-buty-2-(2-hydroxy-3,5-di-tert-butylbenzyl)malonate;
3-n-octyl-7,7,9,9-tetramethyl-1,3,8-triazaspiro[4.5]decan-2,4-dione;
bis(1-octyloxy-2,2,6,6-tetramethylpiperidyl)sebacate;
bis(1-octyloxy-2,2,6,6-tetramethylpiperidyl)succinate;
8-acetyl-3-dodecyl-7,7,9,9-tetramethyl-1,3,8-triazaspiro[4,5]decane-2,4-dione;
3-dodecyl-1-(2,2,6,6-tetramethylpiperidin-4-yl)pyrrolidin-2,5-dione;
3-dodecyl-1-(1-ethanoyl-2,2,6,6-tetramethylpiperidin-4-yl)pyrrolidin-2,5-dione;
3-dodecyl-1-(1,2,2,6,6-pentamethylpiperidin-4-yl)pyrrolidine-2,5-dione;
a mixture of 4-hexadecyloxy- and 4-stearyloxy-2,2,6,6-tetramethylpiperidine;
2-undecyl-7,7,9,9-tetramethyl-1-oxa-3,8-diaza-4-oxo spiro [4,5]decane;
bis(2,2,6,6-tetramethyl-4-piperidinyl)1,5-dioxaspiro{5,5}undecane-3,3-dicarboxylate;
bis(1,2,2,6,6-pentamethyl-4-piperidinyl 1,5-dioxaspiro{5,5}undecane-3,3-dicarboxylate;
decanedioic acid, bis(2,2,6,6-tetramethyl-4-piperidinyl)ester, reaction products with 1,1-dimethyl ethyl-hydroperoxide and octane;
bis(1,2,2,6,6-pentamethyl-4-piperidinyl)(3,5-di-tert-butyl-4-hydroxybenzyl)butyl propanedioate (CAS No. 63843-89-0);
bis(2,2,6,6-tetramethyl-4-piperidyl)sebacate (CAS No. 52829-07-9);
bis(1,2,2,6,6-pentamethyl-4-piperidyl)sebacate (for example, Chisorb-292 hindered amine compound, manufactured by Double Bond Chemical, Taiwan);
and combinations thereof.

More preferably, examples of the hindered amine compound include:
decanedioic acid, bis(2,2,6,6-tetramethyl-4-piperidinyl)ester, reaction products with 1,1-dimethyl ethyl-hydroperoxide and octane;
bis(1,2,2,6,6-pentamethyl-4-piperidinyl)(3,5-di-ter t-butyl-4-hydroxybenzyl)butyl propanedioate (CAS No. 63843-89-0); bis(1,2,2,6,6-pentamethyl-4-piperidinyl)sebacate;
and combinations thereof.

Most preferably, the hindered amine compound is bis(1,2,2,6,6-pentamethyl-4-piperidinyl)sebacate.

Preferably, examples of the triazine compound include:
2,4-bis-octylmercapto-6-(3,5-di-tert-butyl-4-hydroxyanilino)-s-triazine;

2-octylmercapto-4,6-bis-(3,5-di-tert-butyl-4-hydroxyanilino)-s-triazine;
2-octylmercapto-4,6-bis-(3,5-di-tert-butyl-4-hydroxyphenoxy)-s-triazine;
2,4,6-tris-(3,5-di-tert-butyl-4-hydroxyphenoxy)-s-triazine;
2,4,6-tris-(3,5-di-tert-butyl-4-hydroxyphenylethyl)-s-triazine;
2-(4,6-diphenyl-1,3,5-triazin-2-yl)-5-hexyloxy-phenol;
4,6-bis-(2,4-dimethylphenyl)-2-(2-hydroxy-4-(3-dodecyloxy-2-hydroxypropoxy)-phenyl)-s-triazine;
4,6-bis-(2,4-dimethylphenyl)-2-(2-hydroxy-4-(3-tridecyloxy-2-hydroxypropoxy)-phenyl-s-triazine); and combinations thereof.

More preferably, examples of the triazine compound include:
2-(4,6-diphenyl-1,3,5-triazin-2-yl)-5-hexyloxy-phenol;
4,6-bis-(2,4-dimethylphenyl)-2-(2-hydroxy-4-(3-dodecyloxy-2-hydroxypropoxy)-phenyl)-s-triazine;
4,6-bis-(2,4-dimethylphenyl)-2-(2-hydroxy-4-(3-tridecyloxy-2-hydroxypropoxy)-phenyl-s-triazine; and combinations thereof.

Most preferably, the triazine compound is a mixture of 4,6-bis-(2,4-dimethylphenyl)-2-(2-hydroxy-4-(3-dodecyloxy-2-hydroxypropoxy)-phenyl)-s-triazine and 4,6-bis-(2,4-dimethylphenyl)-2-(2-hydroxy-4-(3-tridecyloxy-2-hydroxypropoxy)-phenyl-s-triazine.

In addition to the components A and B, the light stabilizing liquid matter of the present invention can include other light stabilizers, such as a benzophenone compound and/or an ester compound (for example, a benzoate compound).

Preferably, examples of the benzophenone compound include:
2,4-dihydroxybenzophenone;
2-hydroxy-4-methoxybenzophenone;
2-hydroxy-4-octyloxybenzophenone;
2-hydroxy-4-decyloxybenzophenone;
2-hydroxy-4-dodecyloxybenzophenone;
2-hydroxy-4-benzyloxybenzophenone;
2,2'-dihydroxy-4,4'-dimethoxybenzophenone;
2,2',4,4'-tetrahydroxybenzophenone;
2,4-dihydroxy-4'-tert-butyl-benzophenone;
1,6-bis-(3-hydroxy-4-benzoylphenoxy)hexane;
methylenebis-(2-benzoyl-5-methoxyphenol); and combinations thereof.

Preferably, examples of the ester compound include 2-ethylhexyl-2-cyano-3,3-diphenyl acrylate and a benzoate compound. An example of the benzoate compound is 4-[[(methylphenylamino)methylene]amino]-ethyl benzoate (for example, Chisorb-971 manufactured by Double Bond Chemical, Taiwan).

The component C (i.e., the anti-oxidant) used in the light stabilizing liquid matter of the present invention includes at least one of a phosphite compound and a phenolic compound.

Preferably, examples of the phosphite compound include:
tetraphenyl dipropylene glycol phosphite;
oxybispropylene-bis((1,5,9,13,17,21-hexamethyl-7,15,23,23-tetraphenoxy-3,6,8,11,14,16,19,22-octaoxa-7,15,23-triphosphatricos-1-yl)(phenyl)phosphine) (CAS No. 80584-86-7);
tri(4-n-nonylphenyl)phosphate;
diphenyl isodecyl phosphate;
ELV-(2,4-di-6)-butyl-6-methylphenyl)ethyl Phosphorate;
3,9-bis(2,4-di-tert-butyl phenoxy)-2,4,8,10-tetraoxa-3,9-diphosphaspiro[5,5]undecane;
tris(2,4-di-tert-butyl phenyl)phosphate;
tris(phenyl)phosphite; and combinations thereof.

More preferably, examples of the phosphite compound include oxybispropylene-bis((1,5,9,13,17,21-hexamethyl-7,15,23,23-tetraphenoxy-3,6,8,11,14,16,19,22-octaoxa-7,15,23-triphosphatricos-1-yl)(phenyl)phosphine); tri(4-n-nonylphenyl)phosphate; tetraphenyl dipropylene glycol phosphite; and combinations thereof.

The most preferred example of the phosphite compound is tetraphenyl dipropylene glycol phosphate;
Preferably, examples of the phenolic compound include:
3,5,-bis(1,1-dimethyl-ethyl)-4-hydroxy-, $C_{7-9}$ branched alkyl esters of benzenepropanoic acid;
2,6-di-tert-4-methyl-phenyl;
2,6-di-tert-butyl-4-nonyl-phenol;
2,2'-methylene-bis-(4-methyl-6-tert-butyl-phenol);
2,2'-isobutylidene-bis-(4,6-dimethyl-phenol);
4,4'-butylidene-bis-(2-tert-butyl-5-methyl-phenol);
4,4'-thio-bis-(2-tert-butyl-5-methyl-phenol);
2,2'-thio-bis-(6-tert-butyl-4-methyl-phenol);
2,5-di-tert-amyl-hydroquinone;
polymeric sterically hindered phenol, copolymer of pentadiene and para-cresol;
octadecyl-3-(3',5'-di-t-butyl-4'-hydroxyphenyl)propionate;
tetrakismethylene(3,5-di-t-butyl-4-hydroxyhydrocinnamate) methane;
tris(3,5-di-t-butyl-4-hydroxybenzyl)isocyanurate;
2,2'-thiodiethyl bis-(3,5-di-t-butyl-4-hydroxyphenyl)propionate;
1,1,3-tris-(2'-methyl-4'-hydroxy-5'-t-butylphenyl)butane;
4,6-bis(octylthiomethyl)-o-cresol;
4,6-bis(dodecylthiomethyl)-o-cresol; and combinations thereof.

More preferably, examples of the phenolic compound include:
octadecyl-3-(3',5'-di-tert-butyl-4'-hydroxyphenyl)propionate;
4,6-bis(octylthiomethyl)-o-cresol;
4,6-bis(dodecylthiomethyl)-o-cresol;
3,5,-bis(1,1-dimethyl-ethyl)-4-hydroxy-, $C_{7-9}$ branched alkyl esters of benzenepropanoic acid; and combinations thereof.

The most preferred example of the phenolic compound is 3,5,-bis(1,1-dimethyl-ethyl)-4-hydroxy-, $C_{7-9}$ branched alkyl esters of benzenepropanoic acid.

It should be noted that an aromatic amine compound and/or a thio compound of dialkyl ester can be optionally included in the light stabilizing liquid matter of the present invention when the phenolic compound is used as the component C. Preferably, the aromatic amine compound is Benzenamine, N-phenyl-, reaction products with 2,4,4-trimethylpentene. The preferred examples of the thio compound of dialkyl ester include didodecyl 3,3'-thiodipropionate and dioctadecyl 3,3'-thiodipropionate.

Optionally, any suitable additives commonly used in the art can be included in the light stabilizing liquid matter of the present invention. The amount of the additives is less than 10 wt % based on the total weight of the light stabilizing liquid matter.

Examples of the additives include, but are not limited to, metal deactivators, hydroxylamines, nitrones, lactones, costabilizers, nucleating agents, clarifying agents, neutralizers, metallic stearates, metal oxides, hydrotalcites, fillers, reinforcing agents, plasticizers, lubricants, pigments, rheological additives, catalysts, level agents, optical brighteners, flame retardant agents, anti-static agents, blowing agents, solvents, organic oligomers and polymers, rheology modifiers, including thickeners, surfactants, soaps including soaps based on salts of fatty acids for example sodium lauryl sulfate, silicones and emulsifiers, alone or in combination.

In addition to phosphite compound and a phenolic compound, other anti-oxidants commonly used in the art can be used in the liquid matter of the present invention, and include, but are not limited to, alkylated monophenols, alkylthiomethylphenols, hydroquinones and alkylated hydroquinones, tocopherols, hydroxylated thiodiphenyl ethers, alkylidenebisphenols, benzyl compounds, hydroxybenzylated malonates, aromatic hydroxybenzyl compounds, benzylphosphonates, acylaminophenols, esters of β-(3,5-di-tert-butyl-4-hydroxyphenyl)propionic acid, esters of β-(5-tert-butyl-4-hydroxy-3-methylphenyl)propionic acid, esters of β-(3,5-dicyclohexyl-4-hydroxyphenyl)propionic acid, esters of 3,5-di-tert-butyl-4-hydroxyphenyl acetic acid, amides of β-(3,5-di-tert-butyl-4-hydroxyphenyl)propionic acid, ascorbic acid, aminic antioxidants, phenothiazines phosphites and phosphonites, and combinations thereof.

Examples of the solvent useful in the liquid matter of the present invention include, but are not limited to, 1-methoxy-2-propylene glycol acetate, butyl ethylene glycol acetate, ethyl ethylene glycol acetate, methoxypropanol, octane, decane, dodecane, hexadecane, Stoddard solvent, fluorocarbons, aromatic solvent (for example, xylene), fatty alcohols (for example, methanol, ethanol, propanol, isopropanol, butanol, isobutanol, t-butanol, hexanol, octanol, cyclohexanol, and decanol), glycols (for example, ethylene glycol and propylene glycol), ketones (for example, acetone, butanone, pentanone, cyclopentanone, and cyclohexanone), esters, amides, and ureas of fatty alcohols, and combinations thereof.

Examples of organic oligomers and polymers useful in the liquid matter of the present invention include, but are not limited to, petroleum jelly, parrafin oil, mineral oils, polyacrylic acid, acrylic oligomers, polyacrylates, polyacrylamides, and combinations thereof.

Examples of the rheology modifiers and the thickeners useful in the liquid matter of the present invention include, but are not limited to, pseudoplastic thixotropes (for example, VISCALEX™ AT89, a liquid dispersion acrylic acid copolymer; or VISCALEX™ HV 30, a methacryllic acid copolymer associative thickener), Newtonian fluids, acrylic polymers, cross-linked acrylic polymers, associative thickeners, alginates, carrageenan, cellulose and derivatives thereof (for example, carboxymethylcellulose derivatives having counterions such as sodium or potassium ions, hydroxypropyl cellulose, hydroxyethyl cellulose, hydroxypropylmethyl cellulose, methylcellulose, or the like), guar, guar derivatives, locust bean gum, xanthan gum, organoclays, water-swellable clays, silica, polyvinylpyrrolidones, polyethylene, polyethylene oxide, alkali swellable emulsion thickeners (ASE), hydrophobically modified ASE (HASE), hydrophobically modified urethane thickener (HEUR), liquid dispersion polymers (LDPs), and combinations thereof.

Examples of the surfactants useful in the liquid matter of the present invention include, but are not limited to, anionic surfactants (for example, sulfonates, carboxylates, sulfates, and phosphates); nonionic surfactants (for example, acetylenic glycol, alkylpolyglycoside, alcohol ethoxylate, alkylphenol ethoxylate, alkanolamide, block copolymers, dialkylsiloxanes, and fluorosurfactants); cationic surfactants (for example, quaternary amines); amphoterics (for example, N-alkylbetaines); and combinations thereof.

The liquid matter of the present invention is prepared by mixing the components in predetermined amounts at normal pressure to form a mixture, heating the mixture to a temperature at which a clear liquid is formed, and cooling the liquid to a normal temperature so as to obtain a liquid matter containing a high concentration of 2-(2-hydroxy-3-α-cumyl-5-tert-octylphenyl)-2H-benzotriazole and having good storage stability.

The following examples are provided to illustrate the preferred embodiments of the invention, and should not be construed as limiting the scope of the invention.

Chemicals Used in the Examples:

The compounds and the amounts thereof used in the following Examples and Comparative Examples are shown in Tables 1 and 2. Unless otherwise stated, the compounds used in the following Examples and Comparative Examples are manufactured by Double Bond Chemical, Taiwan. All of the compounds used in the Examples and Comparative Examples are liquid at normal temperature and pressure except that 2-(2-hydroxy-3-α-cumyl-5-tert-octylphenyl)-2H-benzotriazole (i.e., Chisorb-5228), 2-(2H-benzotriazol-2-yl)-4-(tert-butyl)-6-(sec-butyl)phenol (i.e., Chisorb-350), and 2-(3',5'-di-t-amyl-2'-hydroxyphenyl)benzotriazole (i.e., Chisorb-328) are solid at normal temperature and pressure.

I. Component A:

2-(2-hydroxy-3-α-cumyl-5-tert-octylphenyl)-2H-benzotriazole, Model No. Chisorb-5228;

II. Component B:

1. Benzotriazole compound other than 2-(2-hydroxy-3-α-cumyl-5-tert-octylphenyl)-2H-benzotriazole:

a. 3-(2H-benzotriazol-2-yl)-5-(1,1-dimethylethyl)-4-hydroxy-$C_{7-9}$-branched and linear alkyl esters of benzenepropanoic acid, Model No. Chisorb-5584;

b. 2-(2H-benzotriazol-2-yl)-4-(tert-butyl)-6-(sec-butyl)phenol, Model No. Chisorb-350;

c. 2-(3',5'-di-tert-amyl-2'-hydroxyphenyl)benzotriazole, Model No. Chisorb-328;

d. a mixture of α-[3-[3-(2H-benzotriazol-2-yl)-5-(1,1-dimethyl-ethyl)-4-hydroxyphenyl]-1-oxopropyl]-ω-[3-[3-(2H-benzotriazol-2-yl)-5-(1,1-dimethyl-ethyl)-4-hydroxyphenyl]-1-oxopropoxy]poly(oxy-1,2-ethanediyl) and polyethylene glycol 300, Model No. Chisorb5530;

e. branched and linear 2-(2H-benzotriazol-2-yl)-6-dodecyl-4-methyl-phenol, Model No. Chisorb-5571;

f. 2-(2-hydroxy-5-tert-octyl)-benzotriazole, Model No. Chisorb-5411;

g. 2-(2-hydroxy-5-dodecyl)-benzotriazole, Model No. Chisorb-800;

2. Hindered Amine Compound:

bis(1,2,2,6,6-pentamethyl-4-piperidinyl)sebacate, Model No. Chisorb-292;

3. Triazine Compound:

a mixture of 4,6-bis-(2,4-dimethylphenyl)-2-(2-hydroxy-4-(3-dodecyloxy-2-hydroxypropoxy)-phenyl)-s-triazine and 4,6-bis-(2,4-dimethylphenyl)-2-(2-hydroxy-4-(3-tridecyloxy-2-hydroxypropoxy)-phenyl-s-triazine, Model No. Chisorb-540;

III. Component C:

1. Phosphate Compound:

tetraphenyl dipropylene glycol phosphite, Model No. Chinox-TP 10;

2. Phenolic Compound:

b 3,5-bis(1,1-dimethyl-ethyl)-4-hydroxy-$C_{7-9}$ branched alkyl esters of benzenepropanoic acid, Model No. Chinox-135;

IV. Other Additives:

Benzoate Compound:

ethyl 4-[[(methylphenylamino)methylene]amino]-benzoate, Model No. Chisorb-971.

Preparations, Tests, and Results of the Examples and Comparative Examples

I. Preparation:

The Examples and the Comparative Examples were prepared by mixing the components shown in Tables 1 and 2.

II. Test for Storage Stability:

The liquid matters of the Examples and the Comparative Examples were packed and were allowed to stand at normal temperature and low temperature (−5° C.) under normal pressure for a period of time to observe whether or not precipitation formed in the liquid matters. The slower the precipitation that formed in the liquid matter, the better the storage stability of the liquid matter will be. The results of the storage stability of the liquid matters of the Examples and the Comparative Examples are shown in Tables 1 and 2. The symbol "⊙" means that no precipitation formed in the liquid matter after one month, the symbol "○" means that precipitation formed in the liquid matter after 20 days, the symbol "Δ" means that precipitation formed in the liquid matter after 2 weeks, symbol "∇" means that precipitation formed after 1 week, symbol "▼" means that precipitation formed in the liquid matter after 3 days, and symbol "X" means that precipitation formed in the liquid matter within 1 day.

The components and the amounts thereof for the preparation of the liquid matters of Examples 1-9 according to the present invention and of Comparative Examples 1-6 and the storage stability of the liquid matters are shown in Table 1, and the components and the amounts thereof for the preparation of the liquid matters of Examples 10-21 according to the present invention and the storage stability of the liquid matters are shown in Table 2. In Table 1, the sum of the amounts of the components A and B in Examples 1, 2 and 4-9 is equal to the total weight of the liquid matter, and therefore the percentage thereof is 100 wt %. In Example 3, the weight percentage of the components A and B is about 93 wt % based on the total weight of the liquid matter. In Table 2, the sum of the components A, B' and C is 100 wt %. It should be noted that in Tables 1 and 2, benzotriazole compound means a benzotriazole compound other than 2-(2-hydroxy-3-α-cumyl-5-tert-octylphenyl)-2H-benzotriazole, and that the compounds with an indication of solid means that the compounds are solid at normal temperature and pressure. Otherwise, the compounds are liquid at normal temperature and pressure.

TABLE 1

| | | | Examples | | | | | | | | | Comparative Examples | | | | | |
|---|---|---|---|---|---|---|---|---|---|---|---|---|---|---|---|---|---|
| | | | 1 | 2 | 3 | 4 | 5 | 6 | 7 | 8 | 9 | 1 | 2 | 3 | 4 | 5 | 6 |
| Component A | | Chisorb-5228 (solid) | 12 | 20 | 1 | 0.5 | 0.5 | 0.5 | 0.5 | 1.7 | 3 | 1 | 1 | 1 | 1 | 1 | 2 |
| Component B | Benzotriazole compound | Chisorb-5584 | | | | 0.5 | 0.4 | 0.4 | 0.5 | | 1 | | | | | | |
| | | Chisorb-350 (solid) | 1 | 2 | 0.5 | 0.1 | 0.1 | 0.1 | 0.1 | 0.1 | | | | | | | |
| | | Chisorb-328 (solid) | 1 | 2 | 0.5 | 0.1 | 0.1 | 0.1 | 0.1 | 0.1 | | | | | | | |
| | | Chisorb-5530 | | | | | | | | | | | | 4 | | | | |
| | | Chisorb-5571 | | | | | | | | | | | | | | 1 | 2 | |
| | | Chisorb-5411 | | | | | | | 0.1 | | | | | | | | | |
| | | Chisorb-800 | | | | | | 0.1 | | | | | | | | | | |
| | Hindered amine compound | Chisorb-292 | 10 | 12 | 1 | 0.6 | 0.6 | 0.6 | 0.6 | 1.2 | 3 | | 1 | | | | | 1.2 |
| | Triazine compound | Chisorb-540 | | | | 0.5 | | | | | | | | | 0.5 | | | |
| Other additives | Benzoate compound | Chisorb-971 | | | 0.2 | | | | | | | | | | | | | |
| | Total parts by weight | | 24 | 36 | 3.2 | 1.8 | 1.8 | 1.8 | 1.8 | 3.6 | 10 | 2 | 2 | 1.5 | 2 | 3 | 3.2 |
| | Ratio of Comp. A (%) | | 50 | 55.56 | 31.25 | 27.78 | 27.78 | 27.78 | 27.78 | 47.22 | 30 | 50 | 50 | 66.67 | 50 | 33.33 | 62.5 |
| Ratio of Component B | Benzotriazole (%) | | 8.33 | 11.11 | 31.25 | 11.11 | 38.89 | 38.89 | 38.89 | 19.44 | 40 | 50 | | | 50 | 66.67 | |
| | Hindered amine compound (%) | | 41.67 | 33.33 | 31.25 | 33.33 | 38.89 | 38.89 | 38.89 | 33.33 | 30 | | 50 | 33.33 | | | 37.5 |
| | Triazine compound (%) | | | | | 27.78 | | | | | | | | | | | |
| Other addtives | Benzoate compound (%) | | | | 6.25 | | | | | | | | | | | | |
| | Ratio of liquid components (%) | | 41.67 | 33.33 | 37.5 | 61.11 | 61.11 | 61.11 | 61.11 | 47.22 | 70 | 50 | 50 | 33.33 | 50 | 66.67 | 37.5 |
| Storage stability | Normal temperature | | Δ | ○ | ○ | ⊙ | ⊙ | ⊙ | ⊙ | Δ | Δ | ∇ | ▼ | ▼ | X | ▼ | ▼ |
| | −5° C. | | ⊙ | ⊙ | ⊙ | ⊙ | ⊙ | ⊙ | ⊙ | ⊙ | ⊙ | ○ | ∇ | Δ | ∇ | Δ | ∇ |

TABLE 2

| | | | Example | | | | | | | | | | | |
|---|---|---|---|---|---|---|---|---|---|---|---|---|---|---|
| | | | 10 | 11 | 12 | 13 | 14 | 15 | 16 | 17 | 18 | 19 | 20 | 21 |
| Component A | | Chisorb-5228 (Solid) | 1 | 1 | 2 | 2 | 2 | 2 | 2 | 2 | 12 | 1.7 | 1.7 | 1.7 |
| Component B | Benzotriazole compound | Chisorb-5584 | | | | | | | | | | 0.5 | 0.5 | 0.5 |
| | | Chisorb-350 (solid) | | | | | | | | | 1 | 0.1 | 0.1 | 0.1 |
| | | Chisorb-328 (solid) | | | | | | | | | 1 | 0.1 | 0.1 | 0.1 |
| | | Chisorb-5571 | 1 | | | | | | | | | | | |

TABLE 2-continued

| | | | \multicolumn{12}{c}{Example} |
|---|---|---|---|---|---|---|---|---|---|---|---|---|---|---|
| | | | 10 | 11 | 12 | 13 | 14 | 15 | 16 | 17 | 18 | 19 | 20 | 21 |
| Component C | Hindered amine compound | Chisorb-292 | | 0.5 | 1.2 | 1.2 | 1.2 | 1.2 | 1.2 | 1.2 | 10 | 1.2 | 1.2 | 1.2 |
| | Phenolic compound | Chinox-135 | | | 0.16 | 1 | 0.32 | | | 0.16 | | | | 0.7 |
| | Phosphite compound | Chinox-TP10 | 0.4 | 0.3 | | | | 0.5 | 1 | 0.16 | 2.4 | 3.5 | 0.7 | |
| \multicolumn{3}{l}{Total parts by weight} | 2.4 | 1.8 | 3.36 | 4.2 | 3.52 | 3.7 | 4.2 | 3.52 | 26.4 | 7.1 | 4.3 | 4.3 |
| \multicolumn{3}{l}{Ratio of component A (%)} | 41.67 | 55.56 | 59.52 | 47.62 | 56.82 | 54.05 | 47.62 | 56.82 | 45.45 | 23.94 | 39.53 | 39.53 |
| Ratio of component B | Benzotriazole (%) | | 41.67 | | | | | | | | 7.58 | 9.86 | 16.28 | 16.28 |
| | Hindered amine compound (%) | | | 27.78 | 35.71 | 28.57 | 34.10 | 32.43 | 28.57 | 34.09 | 37.88 | 16.90 | 27.91 | 27.91 |
| | Sum(%) | | 41.67 | 27.78 | 35.51 | 28.57 | 34.10 | 32.43 | 28.57 | 34.09 | 45.46 | 26.76 | 44.19 | 44.19 |
| Ratio of component C | Phenolic compound (%) | | | | 4.76 | 23.81 | 9.10 | | | 4.55 | | | | 16.28 |
| | Phosphite compound (%) | | 16.67 | 16.67 | | | | 13.51 | 23.81 | 4.55 | 9.09 | 49.30 | 16.28 | |
| | Sum(%) | | 16.67 | 16.67 | 4.76 | 23.81 | 9.10 | 13.51 | 23.81 | 9.09 | 9.09 | 49.30 | 16.28 | 16.28 |
| \multicolumn{3}{l}{Ratio of liquid component (%)} | 58.33 | 44.44 | 40.48 | 52.38 | 43.18 | 45.95 | 52.38 | 43.18 | 46.97 | 73.24 | 55.81 | 55.81 |
| Storage stability | Normal temperature | | Δ | ○ | Δ | ⊚ | ⊚ | Δ | ⊚ | ○ | ⊚ | ⊚ | ⊚ | ⊚ |
| | −5° C. | | ⊚ | ⊚ | ○ | ⊚ | ⊚ | ⊚ | ⊚ | ⊚ | ⊚ | ⊚ | ⊚ | ⊚ |

II. Tests for Light Stability:

2 parts by weight of the liquid matter of each of Examples 1, 2, 3, 5 and 12 were mixed with 100 parts by weight of polyacrylate powders (Model No. ETERAC 7203-X-60, manufactured by Eternal Chemical Co. Ltd., Taiwan) and 5 parts by weight of dodecanoic acid used as a catalyst to form a coating composition. The composition was applied to an aluminum plate, which was then baked and dried in an oven at 150° C. for 20 minutes to form a coating of 10 μm thickness on the aluminum plate.

An initial 20° gloss of the coating was measured using a gloss meter (Model No. micro-TRI-gloss, manufactured by Colorpro Int. Ltd.). The coating was irradiated using an UVA-340 lamp (QUV accelerated weathering tester manufactured by Q-PANEL CORP.) for 3000 hours. The 20 gloss of the coating after the irradiation was measured using the same gloss meter. The difference between the initial gloss and the gloss after the irradiation was calculated. The smaller the difference, the better the light stability of the coating will be.

The results are shown in Table 3. Coating compositions of Comparative Examples 7 and 8 were prepared in the same manner as those of Examples 1, 2, 3, 5 and 12 except that the coating composition of Comparative Example 7 contains only the polyacrylate powders, and does not includes components A and B of the liquid matter, and that the coating composition of Comparative Example 8 is composed of polyacrylate and Chisorb-5228 (i.e., the component A of the liquid matter of the present invention), and does not include the component B of the liquid matter.

TABLE 3

| | | Comparative Example | | Example | | | | |
|---|---|---|---|---|---|---|---|---|
| | | 7 | 8 | 1 | 2 | 3 | 5 | 21 |
| \multicolumn{2}{l}{Ratio of component A (%)} | 0 | 100% | 50% | 55.56% | 31.25% | 27.78% | 39.53% |
| Light stability | Initial Gloss | 84 | 85 | 85 | 84 | 84 | 85 | 84 |
| | Gloss after irradiation | 18 | 76 | 73 | 75 | 70 | 80 | 77 |
| | Gloss Difference | 66 | 9 | 12 | 9 | 14 | 5 | 7 |
| | Remaining gloss (%) | 21.43 | 89.41 | 85.88 | 89.29 | 83.33 | 94.12 | 91.67 |

III. Additional Tests for Light Stability:

Coating compositions were made by mixing each of Examples 1, 2, 3, 5 and 21, a polyurethane resin (Model No. Macronal SM516/70BAC, manufactured by CYTEC Company), a hardener (Model No. Desmodur N75, manufactured by BAYER), and a blue pigment in a weight ratio of 2.5:100:24:0.5. Each of the compositions was applied to an aluminum plate, which was then baked and dried in an oven at 80° C. for 30 minutes to form a coating of 10 μm thickness on the aluminum plate.

An initial 20° gloss of the coating was measured using a gloss meter. The aluminum plate having the coating thereon was moved outdoors to be exposed to sun light for one year. The 20° gloss of the coating after the exposure was measured using the same gloss meter. The difference between the initial gloss and the gloss after the exposure was calculated. The smaller the difference, the better the light stability of the coating will be.

The results are shown in Table 4. The coating compositions of Comparative Examples 7 and 8 are identical to those of the Comparative Examples 7 and 8 in Table 3.

liquid of component B is not an important factor to determine the storage stability of the liquid matter.

Examples 10-21 in Table 2 contain components A, B and C. The liquid matters of Examples 13, 14, 16, and 18, which contain more than 45% of 2-(2-hydroxy-3-α-cumyl-5-tert-octylphenyl)-2H-benzotriazole, have excellent storage stability at the normal temperature and at −5° C. Furthermore, the liquid matter of Examples 11 and 17, which contain more than 55% of 2-(2-hydroxy-3-α-cumyl-5-tert-octylphenyl)-2H-benzotriazole, have good storage stability at the normal temperature and at −5° C.

Comparing the storage stability of the examples in Table 2 to that of the examples in Table 1, it is found that for the examples having similar ratio of the component A (such as,

TABLE 4

|  |  | Comparative Example | | Example | | | | |
|---|---|---|---|---|---|---|---|---|
|  |  | 7 | 8 | 1 | 2 | 3 | 5 | 21 |
| Ratio of component A | | 0 | 100% | 50% | 55.56% | 31.25% | 27.78% | 39.53% |
| Light stability | Initial gloss | 92 | 90 | 91 | 92 | 92 | 90 | 92 |
|  | Gloss after the exposure | 37 | 78 | 81 | 83 | 75 | 87 | 86 |
|  | Gloss difference | 55 | 12 | 10 | 9 | 17 | 3 | 6 |
|  | Remaining gloss | 40.22% | 86.67% | 89.01% | 90.22% | 81.52% | 96.67% | 93.48% |

Discussion:

Examples 1-9 in Table 1 are the examples of the liquid matter containing components A and B. The liquid matters of Examples 1-9 have excellent storage stability at a temperature of −5° C., and are stable at least for two weeks at normal temperature. Therefore, the liquid matters of Examples 1-9 have acceptable storage stability.

Examples 1 and 2 contain identical compounds in which Chisorb-350 and Chisorb-328 are solid at normal temperature. Both of Examples 1 and 2 have good storage stability. Specifically, even when the amount of Chisorb-5228 (component A) is increased in Example 2 compared to Example 1, the storage stability of Example 2 at normal temperature is better than that of Example 1. Instead of a mixture of Chisorb-350 and Chisorb-328 used in Examples 1 and 2, Example 9 includes Chisorb-5530 as the benzotriazole compound, and exhibits an acceptable storage stability.

Compared to Examples 1, 2 and 9, Example 3 additionally contains the benzoate compound (i.e., Chisorb-971) and Example 4 additionally contains the triazinecompound (i.e., Chisorb-540). Both of Examples 3 and 4 have good storage stability.

Therefore, the results of Examples 1-9 demonstrate that the liquid matter of the present invention has a storage stability good enough for the use of the downstream users.

On the other hand, each of Comparative Examples 1-6 contains only one of the benzotriazole compound, the hindered amine compound, and the triazine compound of component B. The storage stability of Comparative Examples 1-6 is inferior to that of Examples 1-9. This indicates that at least two compounds of component B should be mixed with component A to render the liquid matter stable.

Furthermore, the compounds used as the component B in Comparative Examples 1-6 are all liquid at the normal temperature. In Comparative Example 5, the weight percentage of the liquid components is as high as 66.67 wt %. However, the storage stability of Comparative Examples 1-6 are poor. Therefore, it is demonstrated that the high amount of the Examples 16 and 18 versus Example 8, or Examples 13 and 15 versus Examples 1 and 2), the examples in Table 2 have storage stability better than that of the examples in Table 1. Examples 20 and 21 are as good as Examples 4-7 and in addition contain a higher percentage of the component A. This is attributed to the presence of the component C in the liquid matter of the present invention.

As shown in Tables 3 and 4, the coating compositions prepared from the examples of the present invention have light stability superior to that of the coating composition prepared from Comparative Example 7 (containing merely the polyacrylate powders, and has no component A). Furthermore, as compared to the light stability of the coating composition prepared from Comparative Example 8 containing powdery 2-(2-hydroxy-3-α-cumyl-5-tert-octylphenyl)-2H-benzotriazole, the coating compositions prepared from the examples of the present invention have light stability similar to or even better than that of Comparative Example 8.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

We claim:

1. A light stabilizing liquid matter that can be added to a composition to be stabilized and that has a storage stability high enough for storage before being added to the composition, comprising:
   a product formed by mixing (A) 2-(2-hydroxy-3-α-cumyl-5-tert-octylphenyl)-2H-benzotriazole with
   (B) at least one benzotriazole compound other than 2-(2-hydroxy-3-α-cumyl-5-tert-octylphenyl)-2H-benzotriazole plus a hindered amine compound, or with
   (B') at least one compound selected from the group consisting of a benzotriazole compound other than 2-(2-hydroxy-3-α-cumyl-5-tert-octylphenyl)-2H-benzotriazole, and a hindered amine compound, and (C) an anti-oxidant including at least one compound selected from the group consisting of a phosphite compound and a phenolic compound, wherein the sum of the components A and B, or the components A, B' and C is in an amount more than 90 wt % based on a total weight of the light stabilizing liquid matter.

2. The light stabilizing liquid matter as claimed in claim 1, wherein the sum of the components A and B, or the components A, B' and C is in an amount more than 99%, and the component A is in an amount ranging from 25 wt % to 60 wt % based on the total weight of the light stabilizing liquid matter.

3. The light stabilizing liquid matter as claimed in claim 1, wherein the component (B) further includes a triazine compound to be mixed with the component (A).

4. The light stabilizing liquid matter as claimed in claim 1, wherein the component (B) includes one or more benzotriazole compounds other than 2-(2-hydroxy-3-α-cumyl-5-tert-octylphenyl)-2H-benzotriazole, the benzotriazole compounds of the component (B) being selected from the group consisting of:

a combination of 2-(2H-benzotriazol-2-yl)-4-(tert-butyl)-6-(sec-butyl)phenol, and 2-(3',5'-di-tert-amyl-2'-hydroxyphenyl)benzotriazole;

a combination of 3-(2H-benzotriazol-2-yl)-5-(1,1-dimethylethyl)-4-hydroxy-$C_{7-9}$-branched and linear alkyl esters of benzenepropanoic acid, 2-(2H-benzotriazol-2-yl)-4-(tert-butyl)-6-(sec-butyl)phenol, and 2-(3',5'-di-tert-amyl-2'-hydroxyphenyl)benzotriazole;

a combination of 3-(2H-benzotriazol-2-yl)-5-(1,1-dimethylethyl)-4-hydroxy-$C_{7-9}$-branched and linear alkyl esters of benzenepropanoic acid, 2-(2H-benzotriazol-2-yl)-4-(tert-butyl)-6-(sec-butyl)phenol, 2-(3',5'-di-tert-amyl-2'-hydroxyphenyl)benzotriazole, and 2-(2-hydroxy-5-tert-octyl)-benzotriazole;

a combination of 2-(2H-benzotriazol-2-yl)-4-(tert-butyl)-6-(sec-butyl)phenol, 2-(3',5'-di-tert-amyl-2'-hydroxyphenyl)benzotriazole, and 2-(2-hydroxy-5-dodecyl)-benzotriazole; and a combination of α-[3-[3-(2H-benzotriazol-2-yl)-5-(1,1-dimethylethyl)-4-hydroxyphenyl]-1-oxopropyl]-ω-[3-[3-(2H-benzotriazol-2-yl)-5-(1,1-dimethylethyl)-4-hydroxyphenyl]-1-oxopropoxy]poly(oxy-1,2-ethanediyl), and polyethylene glycol.

5. The light stabilizing liquid matter as claimed in claim 1, wherein said hindered amine compound is selected from the group consisting of decanedioic acid, bis(2,2,6,6-tetramethyl-4-piperidinyl)ester, reaction products with 1,1-dimethyl ethyl-hydroperoxide and octane; bis(1,2,2,6,6-pentamethyl-4-piperidinyl)(3,5-di-tert-butyl-4-hydroxybenzyl) butyl propanedioate; and bis(1,2,2,6,6-pentamethyl-4-piperidinyl)sebacate.

6. The light stabilizing liquid matter as claimed in claim 1, wherein said hindered amine compound is bis(1,2,2,6,6-pentamethyl-4-piperidinyl)sebacate.

7. The light stabilizing liquid matter as claimed in claim 3, wherein said triazine compound is selected from the group consisting of 2-(4,6-diphenyl-1,3,5-triazin-2-yl)-5-hexyloxy-phenol; 4,6-bis-(2,4-dimethylphenyl)-2-(2-hydroxy-4-(3-dodecyloxy-2-hydroxypropoxy)-phenyl)-s-triazine; and 4,6-bis-(2,4-dimethylphenyl)-2-(2-hydroxy-4-(3-tridecyloxy-2-hydroxypropoxy)-phenyl-s-triazine.

8. The light stabilizing liquid matter as claimed in claim 3, wherein said triazine compound is a mixture of 4,6-bis-(2,4-dimethylphenyl)-2-(2-hydroxy-4-(3-dodecyloxy-2-hydroxypropoxy)-phenyl)-s-triazine and 4,6-bis-(2,4-dimethylphenyl)-2-(2-hydroxy-4-(3-tridecyloxy-2-hydroxypropoxy)-phenyl-s-triazine.

9. The light stabilizing liquid matter as claimed in claim 1, further comprising at least one of a benzophenone compound and an ester compound.

10. The light stabilizing liquid matter as claimed in claim 9, wherein said ester compound is selected from the group consisting of 2-ethylhexyl-2-cyano-3,3-diphenyl acrylate and ethyl 4-[(methylphenylamino)methylene]amino-benzoate.

11. The light stabilizing liquid matter as claimed in claim 1, wherein said phosphite compound is selected from the group consisting of oxybispropylene-bis((1,5,9,13,17,21-hexamethyl-7,15,23,23-tetraphenoxy-3,6,8,11,14,16,19,22-octaoxa-7,15,23-triphosphatricos-1-yl)(phenyl)phosphine); tri (4-n-nonylphenyl)phosphate; and tetraphenyl dipropylene glycol phosphite.

12. The light stabilizing liquid matter as claimed in claim 1, wherein said phosphite compound is tetraphenyl dipropylene glycol phosphite.

13. The light stabilizing liquid matter as claimed in claim 1, wherein said phenolic compound is selected from the group consisting of octadecyl-3-(3',5'-di-tert-butyl-4'-hydroxyphenyl)propionate; 4,6-bis(octylthiomethyl)-o-cresol; 4,6-bis(dodecylthiomethyl)-o-cresol; and 3,5-bis(1,1-dimethylethyl)-4-hydroxy-$C_{7-9}$ branched alkyl esters of benzenepropanoic acid.

14. The light stabilizing liquid matter as claimed in claim 1, wherein said phenolic compound is 3,5-bis(1,1-dimethylethyl)-4-hydroxy-$C_{7-9}$ branched alkyl esters of benzenepropanoic acid.

* * * * *